United States Patent
Watanabe et al.

(10) Patent No.: US 6,582,300 B2
(45) Date of Patent: *Jun. 24, 2003

(54) SKI SIMULATOR

(75) Inventors: Tatsuya Watanabe, Tokyo (JP); Hideki Inoue, Tokyo (JP); Yuji Sugimori, Tokyo (JP); Makoto Sugawara, Tokyo (JP)

(73) Assignee: Sega Enterprises, Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/887,008

(22) Filed: Jun. 25, 2001

(65) Prior Publication Data

US 2001/0049322 A1 Dec. 6, 2001

Related U.S. Application Data

(62) Division of application No. 09/068,099, filed on May 1, 1998, now Pat. No. 6,270,403.

(30) Foreign Application Priority Data

| Sep. 11, 1996 | (JP) | 8-240184 |
| Sep. 11, 1996 | (JP) | 8-240185 |
| Sep. 11, 1996 | (JP) | 8-278508 |
| Sep. 10, 1997 | (WO) | PCT/JP97/03195 |

(51) Int. Cl.[7] ............................................... A63F 13/00
(52) U.S. Cl. ............................. 463/7; 463/36; 463/31; 434/253; 482/70; 482/71
(58) Field of Search .................. 463/1, 6, 7, 30, 463/32, 36; 273/441, 444, 445; 482/70, 71, 79, 146, 901, 902; 434/253

(56) References Cited

U.S. PATENT DOCUMENTS 5,316,530 A   5/1994   Romer 6,033,227 A * 3/2000   Ishige ..................... 434/247
6,270,403 B1 * 8/2001  Watanabe et al. ......... 434/247

FOREIGN PATENT DOCUMENTS

| DE | 3916638 | 5/1989 |
| DE | 4002223 | 1/1990 |
| EP | 0 275 665 | 7/1988 |
| FR | 2581551 | 11/1986 |
| JP | 1-320077 | 12/1989 |
| JP | 3-24171 | 3/1991 |
| JP | 7-275418 | 10/1995 |
| JP | 08030804 A | 2/1996 |
| JP | 08047580 A | 2/1996 |
| JP | 08131594 A | 5/1996 |
| JP | 08280936 A | 10/1996 |
| JP | 08314368 A | 11/1996 |
| JP | 09000742 A | 1/1997 |

OTHER PUBLICATIONS

WebMagic, Inc. KLOV: Apline Ski [online]. 2002 [retrived on May 23, 2002]. Retrieved from the Internet: <URL: http://www.klov.com/A/Alpine_Ski.html>.*

* cited by examiner

*Primary Examiner*—Jessica Harrison
*Assistant Examiner*—Aaron L. Enatsky
(74) *Attorney, Agent, or Firm*—Dickstein Shapiro Morin & Oshinsky LLP

(57) ABSTRACT

A game machine executes a game program in response to a control signal given by rotating imitation mechanism driven by a player to display an object corresponding to the player on a display device. The game machine includes a rotation detector, a control unit, and a display for displaying the ski course with the trace of the skis according to the display data of the trace generated by the control unit.

6 Claims, 12 Drawing Sheets

SKI SIMULATOR

This application is a divisional of application Ser. No. 09/068,099, filed May 1, 1998, now U.S. Pat. No. 6,270,403 the subject matter of which is incorporated by reference herein.

BACKGROUND OF THE INVENTION

FIELD OF THE INVENTION

The present invention relates to a ski game machine or a ski simulator. More particularly, it relates to a ski simulator by which skiing motions suitable to practice downhill competitions and play a ski game by putting an operator's feet on skis can be enabled.

BACKGROUND OF THE INVENTION

Various kinds of game machines or simulators (hereinafter, they are called simply as game machines) by which operators can gain their experiences of skiing in virtual reality have been proposed. For example, on the game machine, a ski course and a condition where a skier traverses on a ski course like a car driving race can be displayed by moving imitation skis provided in front of a display device side by side.

Such game machines are more useful for beginners of skiing or persons who want to ski on an unexperienced course for a normal skier like a course of downhill competition. Therefore, there is a demand to gain a experience of skiing in virtual reality close to reality as much as possible.

At first, as described above, when the skier's position on a ski course is only arithmetized from the direction of the skis like a steering direction for a car driving race and the condition where the skier moves to the position is only displayed on the display screen, the player can not gain an experience of the condition peculiar to skiing. For instance, a track on a snow surface after the skis are sliding, i.e., a spur, is one of the situations peculiar to skiing. A condition of left and right legs which varies according to an unevenness or an inclined angle on a snow surface of the course is also one of the motions peculiar to skiing. Further, reaction (kick-back) from the snow surface to the skis depending on a direction of the skis or an inclined angle of the ski's edges becomes a necessity for a skier who controls the skis to gain an experience in virtual reality.

However, there is no conventional game machine by which the player can gain an experience with respect to the above-described points, and therefore, it is required to propose such a game machine.

Secondly, in a case of a game machine for playing a car driving race, a driving signal is given to a driving means so that kick-backs generated when the player turns the wheels sharply or vibrations to a handle or a car body depending on a road condition give players realism.

However, it is not general to give the player a drive to support the game progression. In the above-described ski game machine or ski simulator, it is desired to help improving their techniques by providing a means for supporting beginners or players who will slide a difficult course for the first time.

In the conventional game machine, there is a problem to loose virtual realism because the game progression is reset in general at the time the player is out of the ski course or bumps against an obstacle, the displayed picture is varied to a normal direction quite apart from the player's operation, and the condition of the skier, i.e., the player, is reset, thereby the player being apart from the game program for a while.

Thirdly, a ski game machine called as "Alpine racer" has been made public as a ski simulating game machine from Namco Ltd., a game machine producer in Japan. In the game machine, a player puts his or her feet on steps imitating skis which can be swung side by side and moves their feet side by side by himself or herself to control a direction of the skis as watching the video image picture on a skiing ground displayed on a large screen in front of him or her.

A ski simulator produced by Timber Jack Co. in Sweden has a structure in which a rotary axis of the steps imitating skis is inclined.

In the above described ski game machine produced by Namco Ltd., the steps for putting the player's feet can swing side by side around the front-centered rotary axis extending to a perpendicular direction. In the ski game machine, the steps for putting the player's feet rotate around the same rotary shift when the player swings his or her feet side by side. Therefore, it is impossible to provide a difference between front and back of the skier's legs peculiar to an actual skiing motions, such as the inside foot in a turning direction is positioned forward. Further, the rotary axis of the steps for putting the player's feet is positioned in the perpendicular direction, the left and right feet only swing in a horizontal direction. Therefore, it is also impossible to provide a difference between up and down of the left and light feet peculiar to an actual skiing motion, such as the inside foot in a turning direction is positioned upward, such as an actual skiing motion.

On the other hand, in the ski simulator produced by Timber jack Co. in Sweden having the similar mechanism of Namco, Ltd. but the inclined rotary axis of the steps, a difference between up and down of left and right feet with respect to a perpendicular direction can be provided when the player swings his or her feet side by side. However, the surfaces contacted to the left and right feet are on the same plane unless operating to get up on his or her edges by employing an edging mechanism, which is provided separately. Therefore, there is no difference between up and down of left and right feet with respect to the contacted surfaces.

In the case of the game machine produced by Namco Ltd., a normal line of the contacted surfaces of the left and right feet is basically extending to a perpendicular direction. In the case of the game machine produced by Timber Jack Co., the normal line of the contacted surfaces of the left and right feet is extending to the outside from the center of the displayed screen. Therefore, the operator should take up the stance for skiing that impairs reality.

Therefore, it is an object of the present invention to provide a game machine for solving the above-described conventional problems by which spurs of the skis are traced on a course of the snow surface displayed on the display device.

It is another object of the present invention to provide a game machine by which a conditions of a player's feet varying according to an unevenness or an angle of the snow surface can be displayed.

It is still another object of the present invention to provide a game machine by which virtual kick back from a snow surface to skis can be given to a player.

It is a further object of the present invention to provide a function for giving a player something to support his or her technique for skiing to solve the above-described problems.

It is a still further object of the present invention to provide a game machine in which when a player is out of a skiing course or bumps against an obstacle, a game can be compulsorily returned to a normal condition or the previous condition before the player lost the control, and the player is not be apart from the game progression by compulsorily guiding the player.

A still further object of the present invention to provide a ski simulator to make it possible to mechanically reproduce a difference of front-back and up-down between an outer foot and an inner foot while a player maintains control in a turn, in order to have the player shift his or her weight from the outer foot to the inner foot when parallel skiing, and therefore, the player can easily change his or her left and right feet as if he or she walks.

DISCLOSURE OF THE PRESENT INVENTION

According to one aspect of this invention, these objects are achieved by a ski game machine, executing a game program in response to a control signal given by rotating imitation skis by a player and displaying an object of a skier corresponding to the player, which machine comprises a ski rotation detector for generating the control signal by detecting direction and degree of a rotation of the imitation ski; a control unit for obtaining position data showing a current position of the skier on a ski course according to data of ski course and the control signal, generating polygon data showing traces of the skis of the skier according to the position data, storing the polygon data while the skier is skiing on the ski course, and generating display data of the traces to be displayed on the display device according to the stored polygon data of the traces; and a display for displaying the ski course with the traces of the skis according to the display data of the traces generated by the control unit.

As described above, according to the present invention, the polygon data of the spurs which are traces of the skies can be stored while the skier is skiing on the course. Therefore, the spurs can be continued to displayed while a player is playing the game.

Further, according to the present invention, these objects are achieved by a ski game machine, executing a game program in response to a control signal given by rotating imitation skis by a player and displaying an object of a skier corresponding to the player, which machine comprises a ski rotation detector for generating the control signal by detecting direction and degree of a rotation of the imitation ski; a game executing unit for obtaining position data showing a current position of the skier on a ski course according to data of ski course and the control signal, obtaining a distance for dropping the skier's feet on a snow surface according to the change of the position data, obtaining data of a current position of the skier's waist by making a distance for dropping the player's waist smaller than the distance for dropping the feet, obtaining angles between thighs and shanks set to a predetermined length from the feet and waist positions and generating angle data of the thighs and shanks; a video image processor for generating polygon data of the thighs and shanks according to the angle data and generating display data of the thighs and shanks to display according to the polygon data; and a display for displaying the skier's legs in a form according to an unevenness and an inclined angle on the snow surface according to the display data of the thighs and shanks generated from the video image processor.

Additionally, according to the present invention, these objects are achieved by a ski game machine in which a game program is executed in response to a control signal given by rotating imitation skis by a player to display an object of a skier corresponding to the player, which machine comprises a ski rotation detector for generating the control signal by detecting direction and degree of a rotation of the imitation ski; a control unit for obtaining speed data showing the current speed of the skier on a ski course according to data of ski course and the control signal, generating a driving signal for driving the imitation skis when the rotation degree of the imitated skis is exceeded than a predetermined threshold corresponding to the speed data; and a ski driver which receives the driving signal for giving a predetermined level of vibration to the imitation skies.

Alternatively, according to the present invention, the above-described objects are achieved by a ski game machine in which a game program is executed in response to a control signal given by rotating imitation skis by a player to display an object of a skier corresponding to the player, which machine comprises: a ski rotation detector for generating the control signal by detecting a rotation of the imitation skis; a storage medium for storing data of a ski course including at least data of a predetermined route on a ski course; a control unit for obtaining position data showing the current position of the skier according to the control signal and generating a ski driving signal so that the position is moved to the predetermined route; and a ski driver for rotatably driving the skis according to the ski driving signal generated by the control unit.

When the player is out of the ski course or bumps against an obstacle, he or she can be guided to an suitable direction by driving the skies. Then, it becomes possible to give the player an experience close to an actual skiing motion because a constant relation can be kept without being apart between the varied display screen and the skis.

The above-described objects are achieved by a ski simulator comprising: vertical shafts provided in a vertical direction in parallel to each other; a pair of swing frames which are fastened to each of the vertical shafts; a link mechanism for linking and synchronizing the pair of the swing frames; and steps for putting the player's feet provided on the front ends of the swing frames.

As described above, according to the present invention, it is possible to position the left and right feet frontward and backward when the operator's feet shift side by side.

Additionally, according to the present invention, these objects are achieved by a ski simulator comprising: vertical shafts provided in vertical direction in parallel to each other; a pair of swing frames fastened to each vertical shaft; a link mechanism for linking and synchronizing the pair of the swing frames; almost horizontal shafts provided on the front end of the swing frames; and steps rotatably provided to the horizontal shaft for putting the feet thereon.

As described above, according to the present invention, when either of the operator's legs twists toward a left or right direction, the operator's feet positions are respectively shifted backward and frontward.

Further, according to the present invention, these objects are achieved by a ski simulator comprising: vertical shafts provided in a vertical direction in parallel to each other; a pair of swing frames fastened to each vertical shafts; a link mechanism for linking and synchronizing the pair of the swing frames; a pair of almost horizontal shafts provided on each front ends of the swing frames; and a pair of steps, rotatably provided to the horizontal shaft, for putting the feet thereon; and a link mechanism for linking and synchronizing the pair of the steps.

As described above according to the present invention, when both legs of the operator twist toward a left or right direction, the operator's feet positions are respectively shifted frontward and backward.

Further, the objects of the present invention are achieved by a ski simulator in which the horizontal shafts provided on the swing frames are slightly inclined to the upper-frontward.

As described above, according to the present invention, the operator's feet are inclined frontward, and therefore, he or she can take a stance for actual skiing on a slope.

Further, according to either of the above-described invention, the above-described objects can be achieved by a ski simulator in which a driving device for rotating the swing frames is provided.

As described above, according to the present invention, the operator can feel reactions as if he is actually skiing.

Further, according to either of the above-described invention, the above-described objects are achieved by a ski simulator in which a display section for displaying video images of a ski course is provided at front.

As described above, according to the present invention, the operator can feel like skiing in real as he is watching a ski course to be displayed.

Additionally, according to the present invention, these objects are achieved by a ski simulator in which the display section for displaying the video images is slightly inclined upward.

As described above, according to the present invention, the operator can gain an experience as if he is traversing on a slope downward.

PREFERRED EMBODIMENTS OF THE PRESENT INVENTION

Embodiments according to the present invention will be now explained in accompanying with the attached drawings. However, the technical scope of this invention is not restricted by those embodiments.

Figure 1:
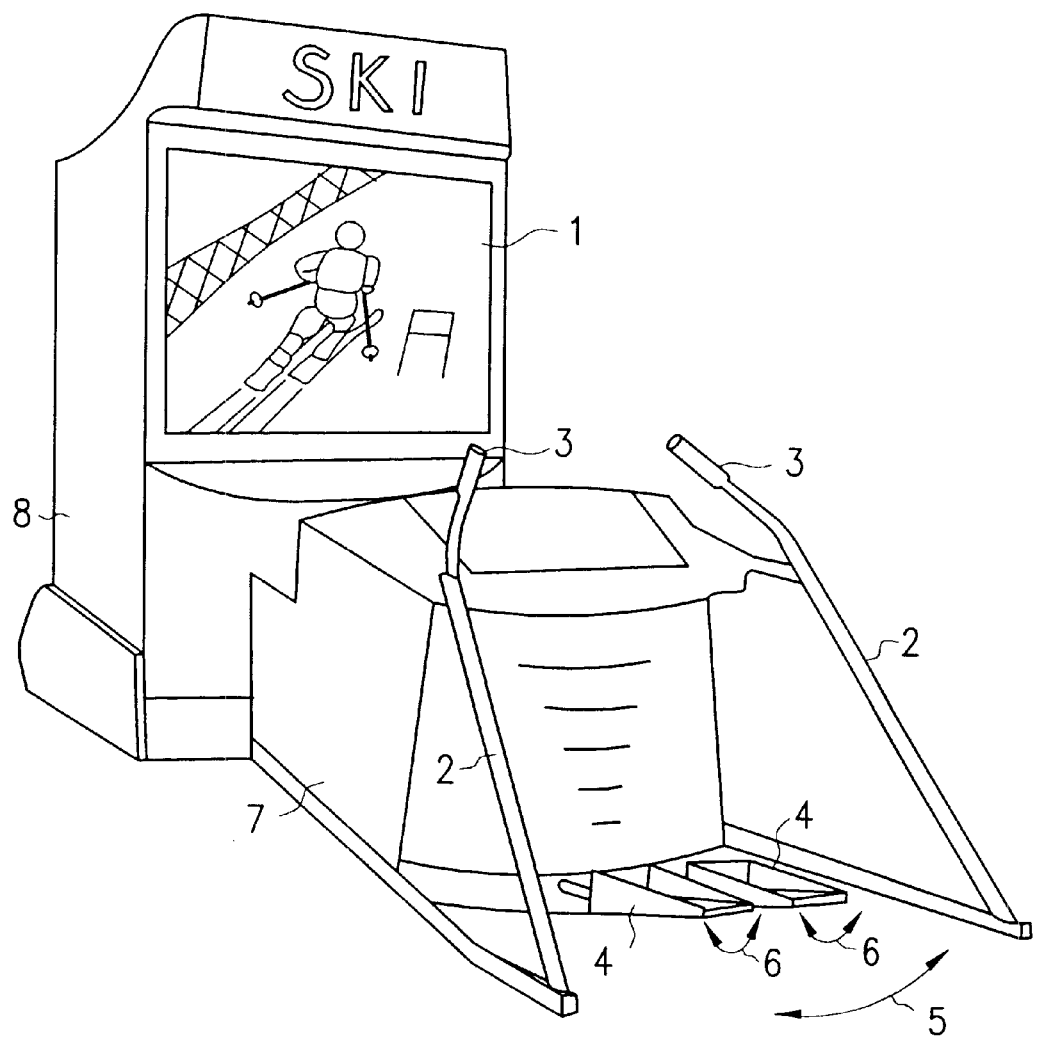
FIG. 1 is a perpendicular view of a game machine according to the embodiment of the present invention in brief.

FIG. 1 is a perpendicular view of a game machine according to an embodiment of the present invention. A display section 1 displays a ski course, obstacles, course flags and skiers thereon. A pair of struts 2 carry handles 3 at their upper ends. Additionally, a pair of imitation skis or steps 4 are provided for controlling side and rotary directions by putting the player's feet thereon. The skis 4 can swing to left and right directions 5 and be respectively twisted along a rotary direction 6 as if a skier sets the skis 4 to get up the edges.

A ski controller 7 stores a ski drive detecting section for detecting a direction and an angle of a drive given from the player to the skis 4 and a ski driving section for giving a drive, for example, a kick back to the skis. A body 8 of the game machine includes a body controlling section for executing a game program, varying a displayed picture according to a drive given from a player to skis, and supplying a driving signal for giving a drive to skis.

Figure 2:
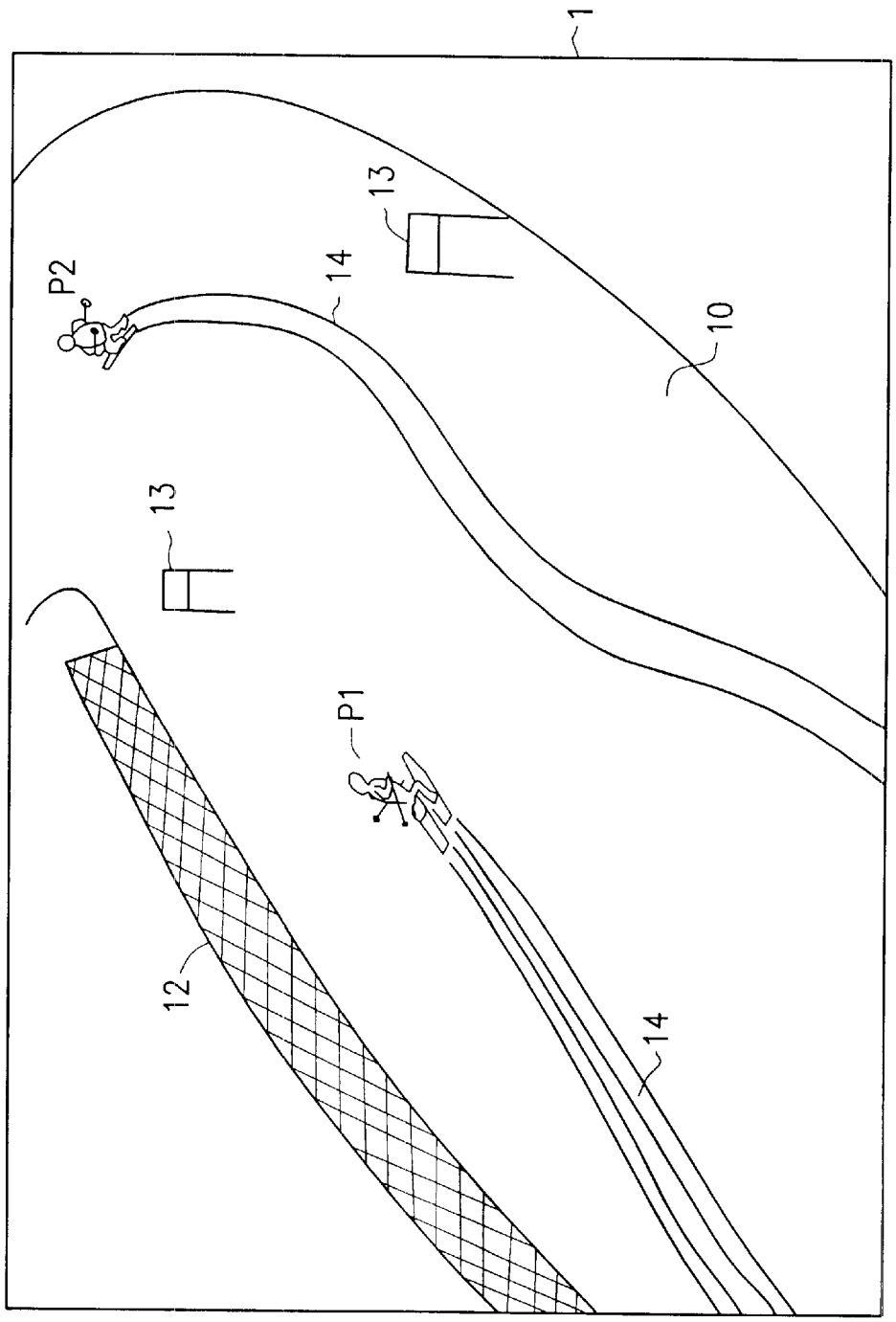
FIG. 2 is an example of a picture displayed on the display device of a ski game machine.

FIG. 2 illustrates one example of the displayed pictures on the above-described ski game machine. Numerals 10, 12 and 13 are respectively a ski course, a net put up on edge of the course and flags on the course. P1 and P2 are skiers in the game. For example, the skier P1 moves as the player does and the skier P2 is a competitor in the game. In this embodiment, the skis of the skiers P1 and P2 trace spurs 14 on the snow surface. Then, the skier's left and right legs are varied according to an unevenness or an inclined angle on the snow surface on the displayed picture.

Figure 3:
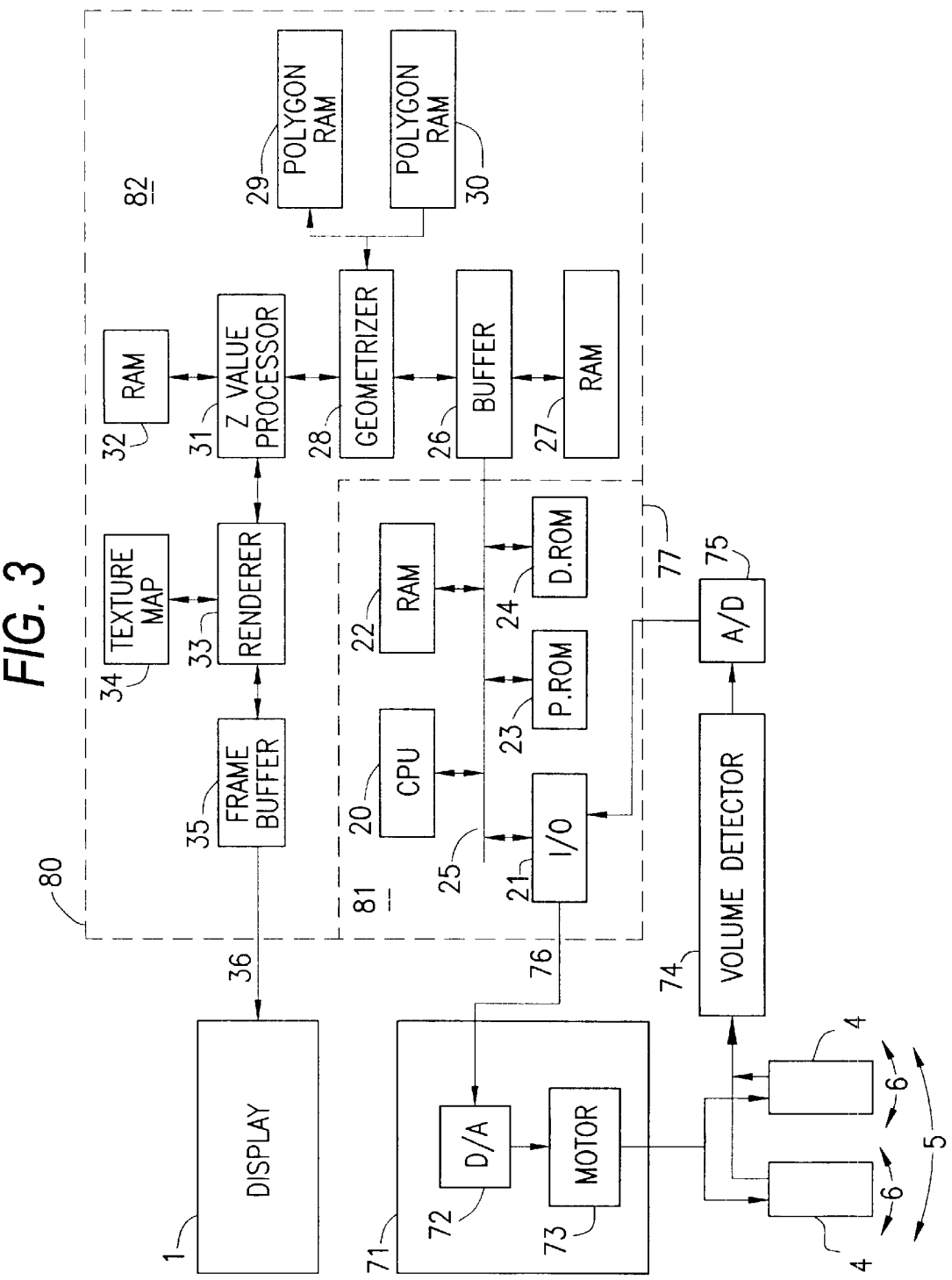
FIG. 3 is a block diagram illustrating a structure of a ski controller 7 and a body control section 80 in the game machine.

FIG. 3 is a block diagram showing a structure of the ski controlling section 7 and the body control section 80 in the game machine. The ski controlling section 7 includes a D/A converter 72 for D/A converting the motor driving signal 76 sent from the body controlling section 80, a motor 73 driven by an analog signal converted in the D/A converter 72, and a volume detecting section 74 for detecting rotary angles of a left or right direction 5 and a rotary direction 6 for setting the skis to get up the edges. In this example, the motor 73 is secured at the ends of the skis by belts, not shown in the diagram, so as to drive each of the pair of skis 4 to the direction 5 in the same way. Additionally, the volume detector 74 outputs analog values given by the player corresponding to the direction 5 of the skis 4 and the direction 6 for setting the edges of the skis. Then, the analog values are converted to digital values by the A/D converter 75, and the converted values are given to an I/O section 21 in the body controlling section 80.

The body controlling section 80 includes a game executing section 81 for executing a game program according to a control signal inputted through the skis 4 of the player and generating video image data and the motor driving signal 76 according to the control signal, and a video image data processing section 82 for video image processing according to the generated video image data and supplying display data 36 to a display device 1.

In the game executing section 81, a CPU 20 for arithmetic operations and executing the game program, an input/output section 21 for inputting the control signal 77 from the player and outputting the motor driving signal 76, a program ROM 23 in which the game program is stored, a ROM 24 in which data relating to course data, polygons or other parameters are stored and a RAM 22 for use in arithmetic operations are connected via a bus 25.

The game program is executed in response to the control signal 77 sent from the player, the video image data, such as polygon data or viewing data, is generated, and the generated data is subsequently stored in the RAM 27 by a buffer controller 26.

The video image data generated in the game executing section 81 instructs to move and rotate one polygon to one direction and display the polygon from one position as a view point, for example. A geometrizer 28 executes an arithmetic for developing the polygon in a coordinate space according to the video image data stored in a RAM 27, and performs perspective transformation of the polygon to two dimensional coordinates on the displayed picture. Therefore, the geometrizer 28 is connected to a polygon data ROM 30 in which polygon data of a ski course, skiers, flags or the like are stored and a polygon RAM 29 in which polygons differed according to the control signal of the player in each game, for example, a net 12 on the end of the course or spurs 14 of the skis, are stored. The condition of the net 12 is varied every time the skier P1 bumps against the net 1 and falls over or the like. Further, a new polygon of the spur 14 is generated whenever the skier P1 passed through the course.

A Z value processor 31 processes a Z value showing the depth of each polygon in the two-dimensional coordinates, i.e., stores the least Z value for the displayed polygon in pixels to a Z value buffer memory 32 to display the foremost polygon (a polygon having the least Z value). Then, in a renderer 33, a texture is read out from a texture map memory 34 and is mapped to each displayed polygon.

The display data generated in this way, for example, a RGB signal, is written on a frame buffer memory 35 in pixels, the display data 36 is given to the display device 1. For example, when a frequency of a frame is 60 Hz, the display data 36 is written to the frame buffer memory 35 in every 1/60 seconds.

[Displaying Spurs]

Figure 4:
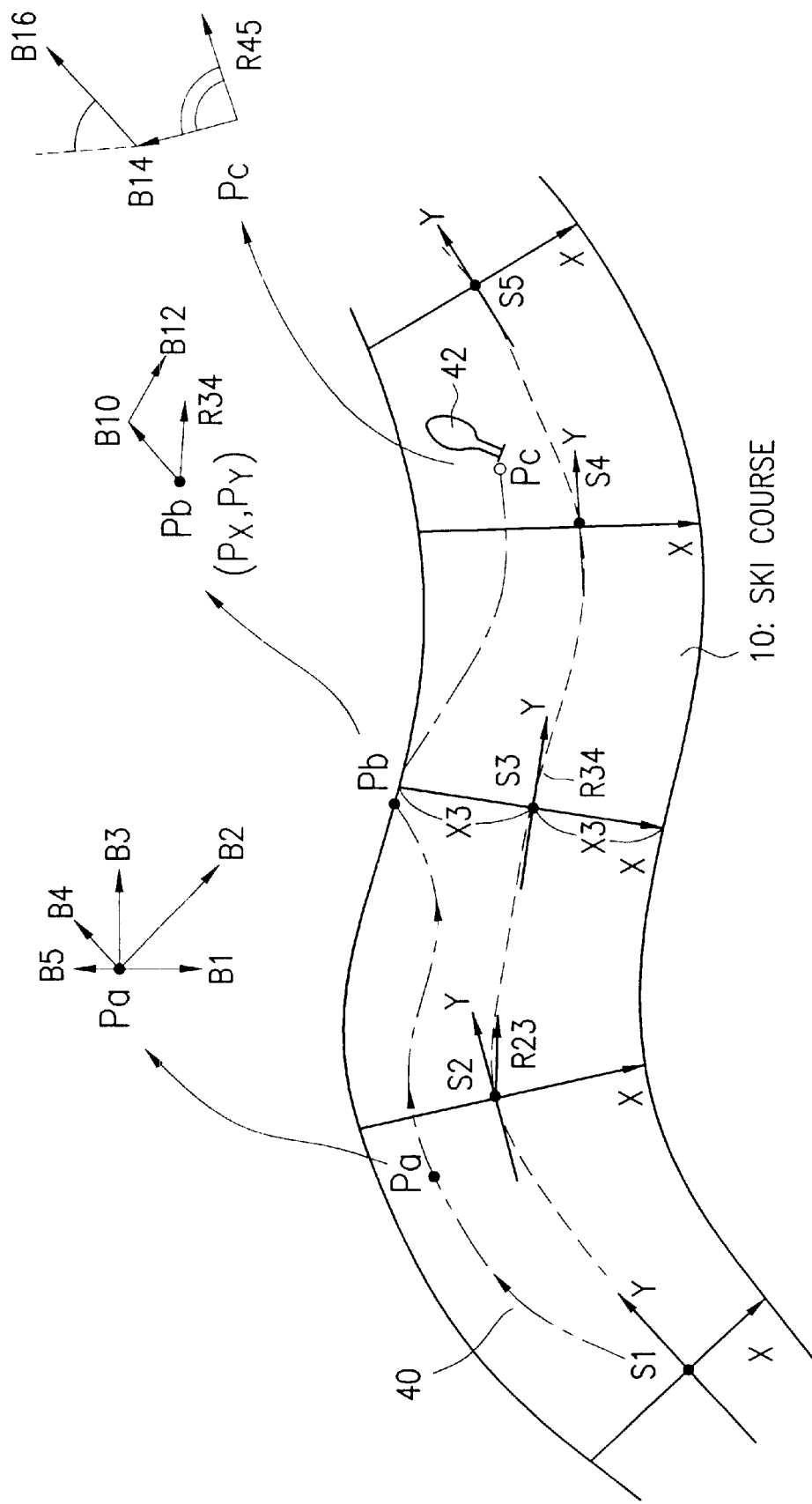
FIG. 4 is a diagram for explaining an algorithm for obtaining a position of a skier P1 corresponding to the player on the displayed picture.

FIG. 4 is a diagram for explaining an example of an algorithm for obtaining a locus of the skier P1 corresponding to the player on the displayed picture. An ideal skiing course, which is shown by a broken line on a ski course, and points S1, S2 . . . S5 on the ideal skiing course are set in every certain distances, and coordinates of the ideal passing points S1 to S5 and widths (x values) of the course in every ideal passing points S1 to S5 are employed as course data. The course data is stored in the data ROM 24. Further, points where the skier P1 positions, for example, vectors B1 to B5 showing each inclined angles in each directions of the skier on a point Pa, are also employed in addition to the data of the points S1 to S5. The directional vectors of the skier on the point Pa can be obtained from arithmetic operations by employing, for example, a speed vector, directional data according to the control signal 77 sent from the skis 4 and the vectors B1 to B5 showing the inclined angles. Then, the next locus can be further obtained from the arithmetic operations.

In this way, for instance, when the skier P1 who starts from the ideal passing point S1 moves along single point chain line in FIG. 4, a polygon of the spur 14 is subsequently stored in the polygon RAM 29 according to the data of the skier's position. In this example, coordinate systems on the ski course 10 are divided into coordinate systems in each ideal passing points. Therefore, for example, when the skier passes over a X axis of the ideal passing point S2, the coordinates of the skier's locus are determined according to the coordinate systems of the next ideal passing point S3.

All of the above-described arithmetic operations for obtaining the skier's loci are executed in the CPU 20 according to the game program stored in the program ROM 23.

As described above, the skier's loci are obtained by the arithmetic operations and the spur corresponding to the player's locus is stored in the polygon RAM 29 of the video image processor 82 as polygon data, and therefore, spurs from the beginning to the end of one ski course can be stored and displayed. A large capacity of the polygon RAM 29 makes it possible to store and display the spurs while the player is playing the game, for example, as a spur for previously sliding is displaying, the skier can try second sliding and a spur of second sliding can be also displayed, concurrently. Therefore, it becomes possible to provide a virtual realistic experience close to an actual skiing to the players.

[Displaying Skier's Legs]

Figure 5:
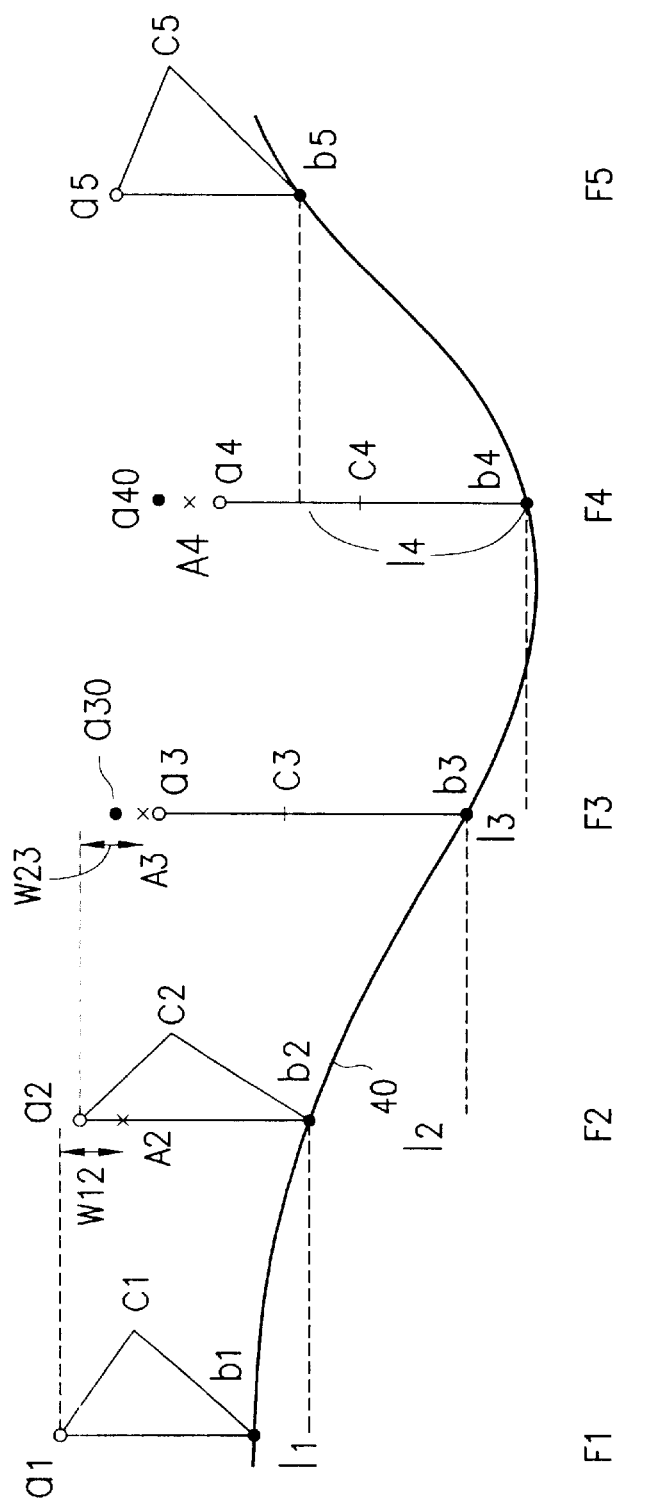
FIG. 5 is a diagram for explaining an example of an algorithm for changing motions of left and right legs of the skier P1 on the displayed picture according to an unevenness or an inclined angle on the snow surface.

FIG. 5 is a diagram for explaining one example of an algorithm for varying motions of legs of the skier P1 according to an unevenness or an inclined angle on a snow surface of a displayed picture. A basic algorithm is to determine foot positions b1 to b5 of the skier P1 according to a curve 40 showing a position of the snow surface, to obtain a drop of a waist position of the skier P1 by delaying from a drop of the skier's leg position and to obtain a knee position c1 from a thigh position a1-c1 and a shank position c1-b1 having a predetermined length according to the leg position b1 and the waist position a1. However, in order to avoid the distance between the foot position and the waist position from being longer than the length of the thigh and the shank, and to avoid the waist position from being lower than the snow surface 40, the waist positions a1 through a5 are compulsorily controlled so as to be within a certain height range from the foot positions b1 through b5.

A detailed example of the algorithm will be now explained. Data showing a height of the snow surface 40 is stored in the data ROM 24. As shown in FIG. 5, the skier moves through each of the five frames F1 to F5 in this example. At first, a thigh a1-c1 and a shank b1-c1 of the skier are positioned on the frame F1 with having a normal angle. When the skier moves to the next frame F2, the foot position b2 is landed on the snow surface 40, and therefore, a drop distance of the skier's feet can be expressed by $l_1$ in FIG. 5. Therefore, a target point A2 where the skier's waist is dropped can be arithmetized with a point where the drop distance $l_1$ of the skier's feet divided into only 1/n (n means an integral) is dropped from a waist point a1 on the frame F1, for example. Therefore, a drop distance $W_{12}$ between the point a2 to the target waist position A2 becomes $l_1/n$. However, it is considered that the waist position is delayed from the point where the feet is dropped, and further, only 1/m (m means an integral) is actually dropped from the waist position. The waist position a2 on the frame F2 can be obtained in this way, for example. In other word, the height of the waist position a2 can be expressed as follows; $a2 = a1 - W_{12}/m$.

Next, a case where the skier P1 moves from the frame F2 to the frame F3 will be explained. In this case, a drop distance of the skier's feet is $l_2$. A distance $W_{23}$ from the point a2 to a target waist position A3 can be obtained by accumulating the drop distance $w_{12}$ when dropping from the frame F1 to F2 as follows: $W_{23} = l_2/n + W_{12}$. Then, an actual drop position can be obtained in consideration into a time leg for dropping the waist position as follows: $a30 = a2 - W_{23}/m$. However, there is a case where a distance from the foot position b3 on the snow surface 40 to the position a30 becomes longer than the total length of the thigh and shank on the position a30. Then, the distance is compulsorily controlled and the position a3 in FIG. 5 becomes a waist position in this example. Therefore, the condition of the skier's legs is displayed as if he or she stretches his or her legs.

A waist position a4 is also obtained on the frame F4 by arithmetic operations can be also obtained in the same way. On the frame F5, the waist position is too close to the snow surface 40 or the waist position is positioned under the snow surface 40. Therefore, it is compulsorily controlled that the wait position a5 is set to a predetermined height according to the feet position.

The above-described algorithm is only one example to realize the present invention, and therefore, other algorithms can be used to realize the present invention. Even if any algorithms are employed, it becomes possible to display conditions of the skier's legs more close to reality by obtaining the leg condition from the feet and waist positions and giving the polygon data showing the legs to the video image processor 82, thereby the leg condition be displayed as actual skiing condition.

[Reaction to the Skis]

Figure 6:
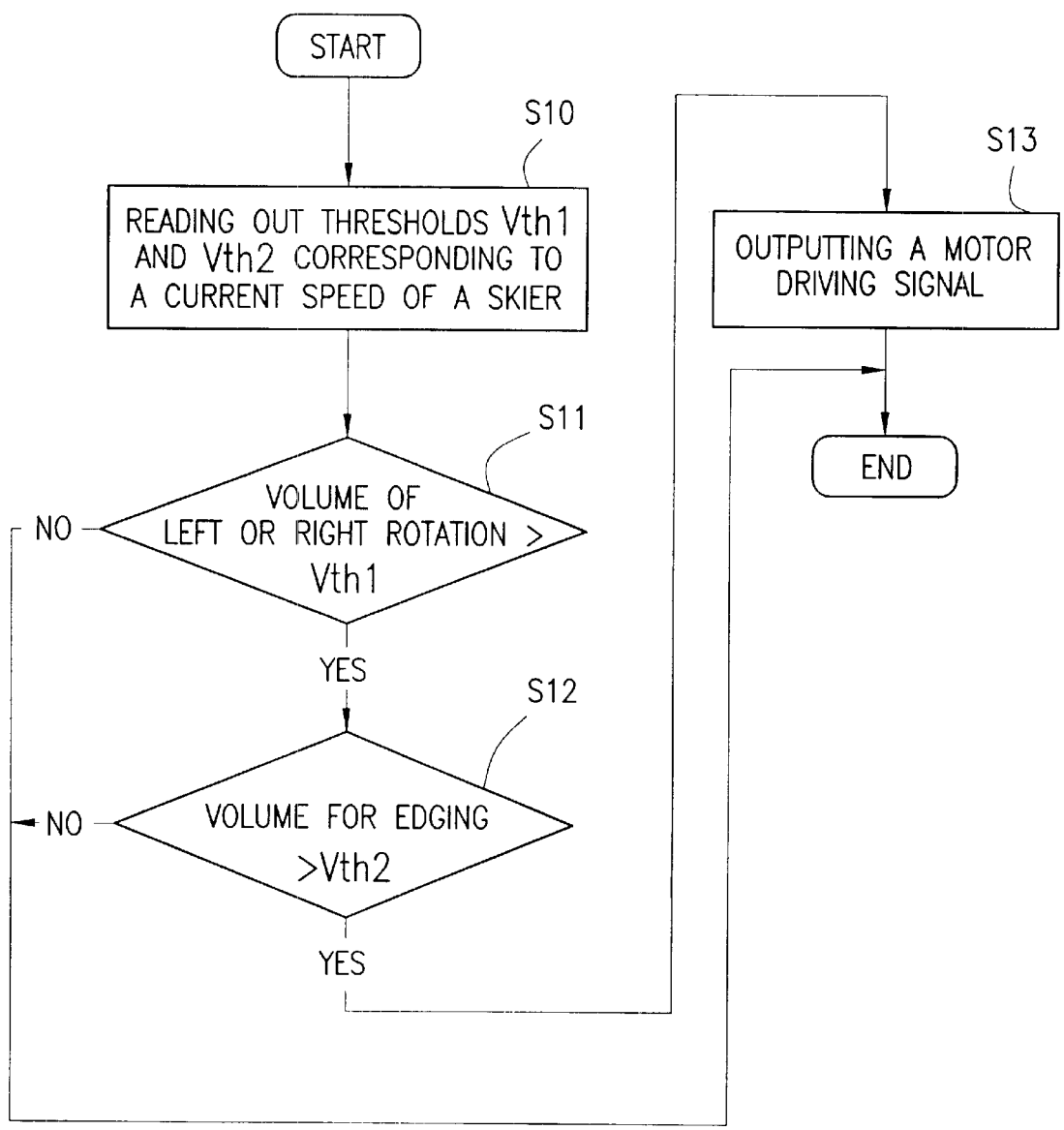
FIG. 6 is a flow chart showing one example of an algorithm when obtaining a motor driving signal 76 for kick back from the snow surface to skis 14.

FIG. 6 is a flowing chart showing an example of an algorithm when the motor driving signal 76 for kick back from the snow surface to the skis 4 is obtained. In this example, when the volume of the left and right direction 5 of the skis 4 and the volume of the rotary direction 6 of the edges are respectively exceeded than each thresholds, the motor driving signal 76 having a level corresponding to the exceeded value are arithmetized to be supplied to the motor driving section 71.

The arithmetic operations will be explained in accompanying with FIG. 6. Each of the thresholds Vth1 and Vth2 corresponding to the current speed of the skier P1 are read out from the data ROM 24 at first (S10). Then, it is judged whether or not the volume of the left and right rotation of the skis 4 is larger than the threshold Vth1 (S11). If the volume is larger than the Vth1, it is further judged whether or not the volume of the rotation 6 to get up the edges of the skis 4 is larger than the second threshold Vth2 (S12). If the volume is also larger than the Vth2, the monitor driving signal 76 is generated and outputted. As the result, it becomes possible to reproduce the kick back for giving vibrations to the skies 4 in the left and right direction 5 by the motor 73.

The strength of the vibration in this time can be varied in almost proportion to the differences between each volume values and the thresholds to reproduce the kick back which is more close to a real condition. Therefore, the player can experience to what extent of kick back is returned when the player places to what extent of rotation of the skis against the speed of the skier P1 on the display.

If the kick back is provided variably as snow condition varies, the player can gain an experience more close to an actual skiing condition. For example, it is possible to reproduce the kick back by changing the level of the motor driving signal according to the snow condition on the course or selecting the thresholds based on two elements of the speed and the condition of the snow surface.

It can be also applied to a car rally game driving through a desert to store and display the above-explained spur of the skis until finishing to slide one course or to store and display spurs over several games, for example. It is further possible to apply to other game machines intended for the games in which some tracks are traced.

[Guiding Skis]

In the embodiments according to the present invention, the skier's position is obtained according to the player's operation. In the present embodiment, when the skier is out of the ski course 10 or the skier bumps on an obstacle of the course, the game executing section 81 generates and gives the suitable motor driving signal 76 and controls the displayed picture according to the change of the volume of the left and right direction 5 put on the skis 4 due to the generated motor driving signal, so that the skier is guided to a course or an original progress direction. Or the game executing section 81 may generate the suitable motor driving signal 76, generate the video image data to control the displayed picture apart from the control signal sent from the skis 4, and supply the generated control signal to the display processing section 82.

In other word, it is possible to guide the player so as to play a ski game well by controlling the motor 73 for driving the skis according to a guiding program in the game executing section 81. That is, when the skier moves along the course as shown by single point chain line in FIG. 4, the skis 4 are compulsorily driven so as to guide the player to a center of the course when the skier is out of the ski course 10 like a point Pb. Additionally, when the skier bumps against an obstacle 42 on the ski course 10, and therefore, the progress direction is largely varied like a point Pc, the skis 4 is compulsorily driven so as to guide the player to the original progress direction. The motor driving signals 76 for guiding are generated according to a guide program stored in a program ROM 23 of the game executing section 81.

Figure 7:
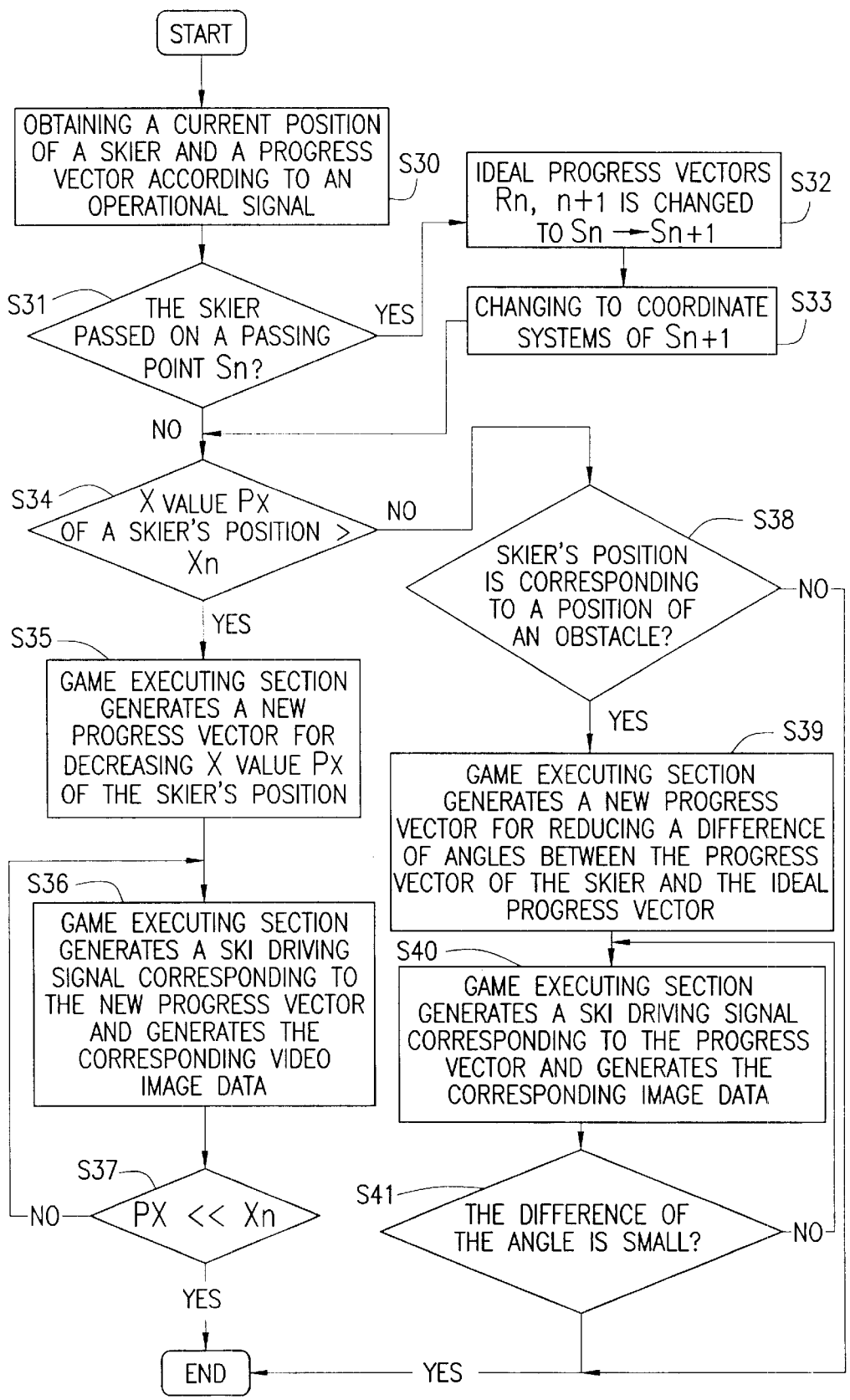
FIG. 7 is a flow chart showing one example of an algorithm for guide.

Then, a detailed guiding algorithm will be now explained. FIG. 7 is a flow chart showing one example of the guiding algorithms. As described above, the guiding program has a set of the position data on ideal points S1 to S5 on an ideal course, shown by a broken line in FIG. 4 of the course 10 where the player should pass through as course data in general. That is data including coordinates showing each ideal points S1 to S5. A point a direction of which is toward a goal of the course from the player's position and which is the most close to the player is used as a target. It is assumed that a target point is S2 on the player's position Pa in FIG. 4 and a directional vector for tying the points S1 and S2 is a new vector of the ideal progress direction when the player passes through the point S1. When the player passes through the point S2, the vector R23 for tying the points S2 and S3 becomes a new vector of the ideal progress direction. In this way, a directional vector for tying the ideal points is defined as an ideal progression vector according to the player's position. The above-described explanations are shown in steps S30 to S32 of FIG. 7.

When the skier passes through the ideal passing points, the coordinate systems is varied to the coordinate systems of which origin is a target ideal passing point (S33).

A reference numeral 40 of FIG. 4 is a track where the skier passes through according to an operational signal of the player. Now, the skier is out of the ski course 10 like a point Pb. In this case, in the game executing section 81, it is judges whether or not a X value Px of the skier's position Pb in the coordinate systems where the point S3 is used as an origin is exceeded than the course width X3 from the origin S3 (S34). If the Px is exceeded than the width X3 like the position Pb, it is detected that the player is out of the course 10. Then, the game executing section 81 generates a direction for decreasing Px, which is a X value of the skier's position as a new progress vector as shown in the step S35 according to the guide program. As shown in a part out of the course of FIG. 4, a new progress vector B12 is obtained instead of the progress vector B10 of the skier in this time.

As the game executing section 81 generates the motor driving signal 76 corresponding to the new progression vector B12 according to the guide program and drives the skis 4 by the motor 73, and guides the player through the driving of the skis, the displayed picture on the display device is varied to the guiding direction according to the video image data. (S36). Such the drive compulsorily performed for guiding in this way is continued until the X value of the player's position becomes enough smaller than the course width X3 (S37), and then, the game is returned to a normal control with the normal game program.

Next, as shown in FIG. 4, an algorithm of a guide program when the skier bumps on an obstacle 24, such as a tree, on the course will be explained. When the skier's position Pc is corresponding to the position of the obstacle 42 (S38), the game executing section 81 generates a vector, for example, B16, as a new progression vector, for reducing the difference of the angles between a progress vector B14, which is largely shifted from the ideal progress direction as the result of the bumping, and the ideal progress vector R45 (S39).

Then, the game executing section 81 generates the motor driving signal 76 corresponding to the progress vector B16 and generates the video image data along the corresponding to a guiding direction (S40). As the result, the skis 4 is compulsorily driven by the motor 73 to guide the player through the skis 4. Concurrently, the displayed picture is also varied to a video image toward the guiding direction according to the video image data. The drive is continued until the difference of the angles between the above-described vectors is reduced enough (S41). After that, the processing is returned to a normal control according to a normal game program.

Although the way to give a drive for guiding the player through the skies according to the guide program when the skier is out of the course was explained, it is also possible to give the player how to set the skis in motions for sliding near the ideal course by replacing the width Xn of the course into the predetermined width from the ideal course. Additionally, before the skier bumps against an obstacle, the skis 4 is compulsorily driven so as to avert the obstacle and guide the player to the direction of the ideal course. In other word, it is possible to teach the player through the skis 4 by giving a certain guiding and driving signal from the game executing section to the motor 73.

[Mechanism of a Ski Simulator]

Figure 8:
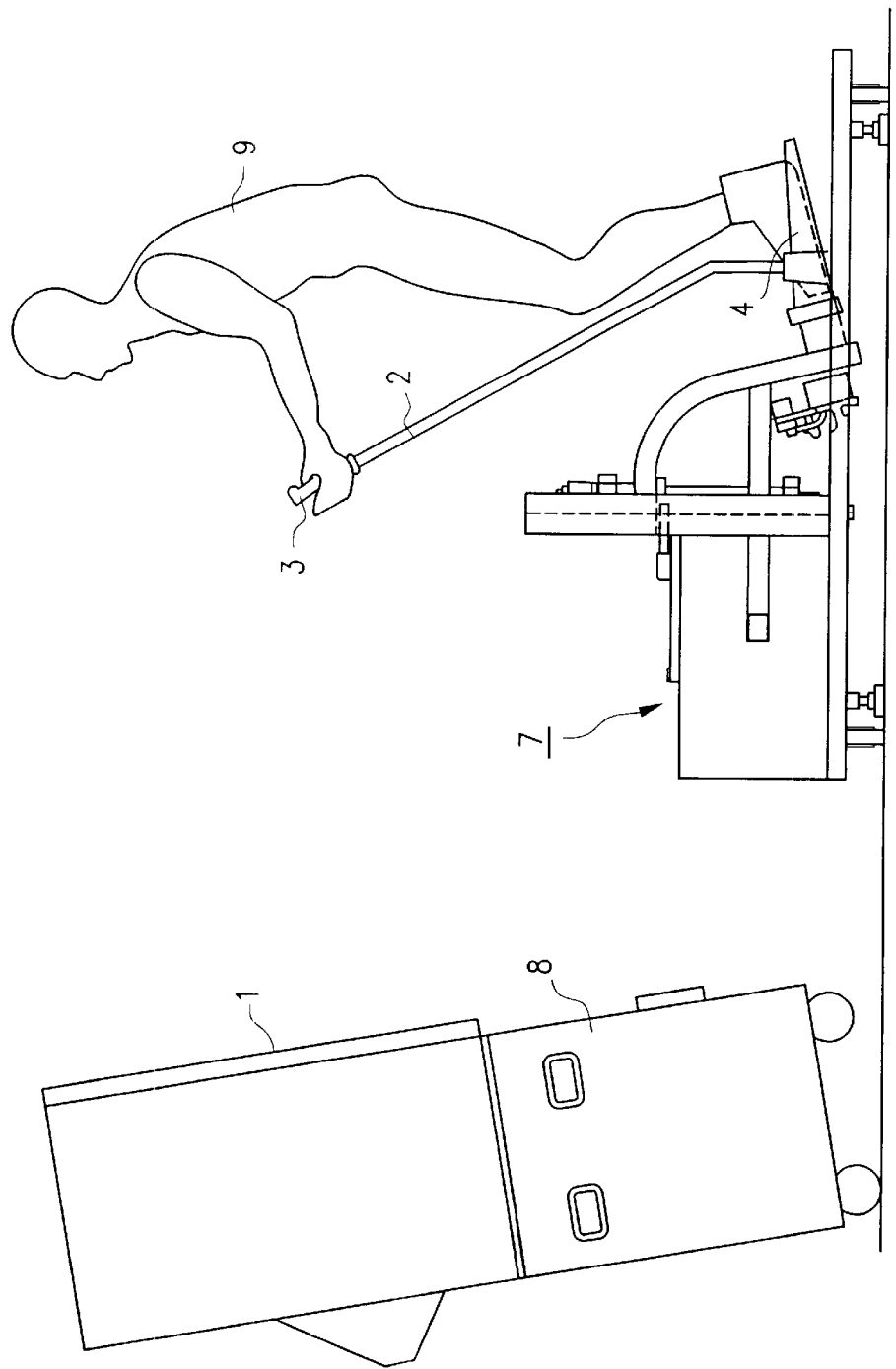
FIG. 8 is a side view of the ski simulator.

Although FIG. 1 shows a perspective view of the ski simulator, FIG. 8 is a side view of the ski simulator. A vertical box 8 is positioned on the front, a large monitor (display section) 1 for displaying a ski course as a video image picture on the front. The large monitor 1 is set at an angle of 10° to the upper-front side. A pair of struts imitating ski stocks 2 are positioned in each sides on the front of the large monitor 1, and handles 3 are provided on the heads of the stocks. A pair of steps 4 imitating skis are positioned on the left and right sides at the center of the front-bottom section (hereinafter, they are called as steps 4). The steps 4 can swing in horizontal and left and right directions 5 and each step can be ratably moved to a rotary direction 6 of an almost horizontal axis along about front-back axis for imitating to get up the skier's edge. Each step 4 is driven and controlled by a ski driving section 7.

The operator 9 starts the game by inserting coins into a coin inserting section, not shown in FIG. 8. The operator 9 puts his or her feet on the steps 4, holds the handles 3 of the stocks with his or her hands, and then, plays the game by swinging his or her feet put on the steps side by side or gets up his or her edges with the ski course displayed on the large monitor 1. Reactions to steps 4 are propagated to the player according to the condition of the ski course, and therefore, the player imitates actual skiing motions by rotating the steps 4 around the almost horizontal direction for edging the skis, or swinging the steps 4 side by side by himself or herself.

Figure 9:
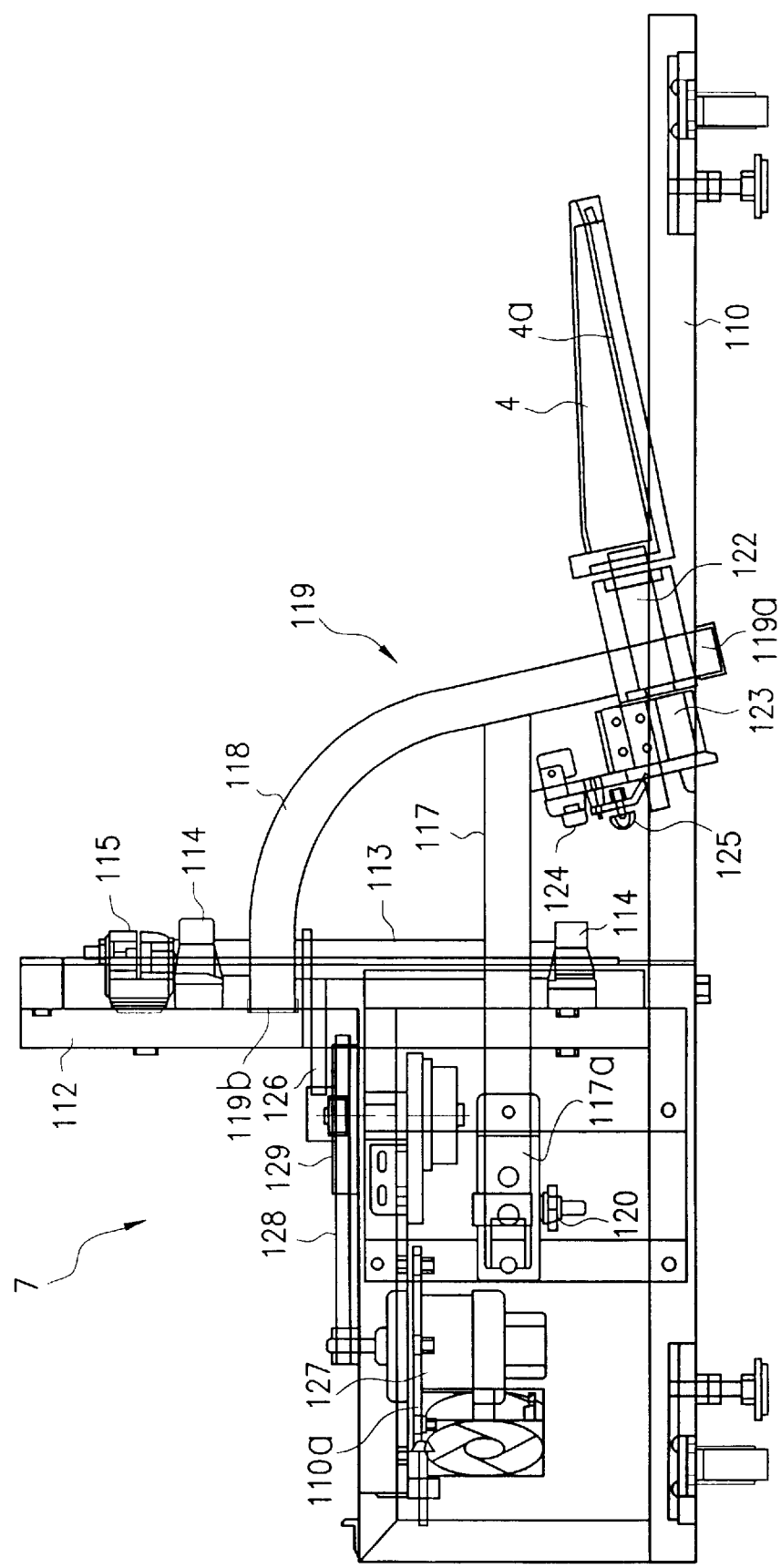
FIG. 9 is a side view of a mechanism of the ski simulator.
Figure 10:
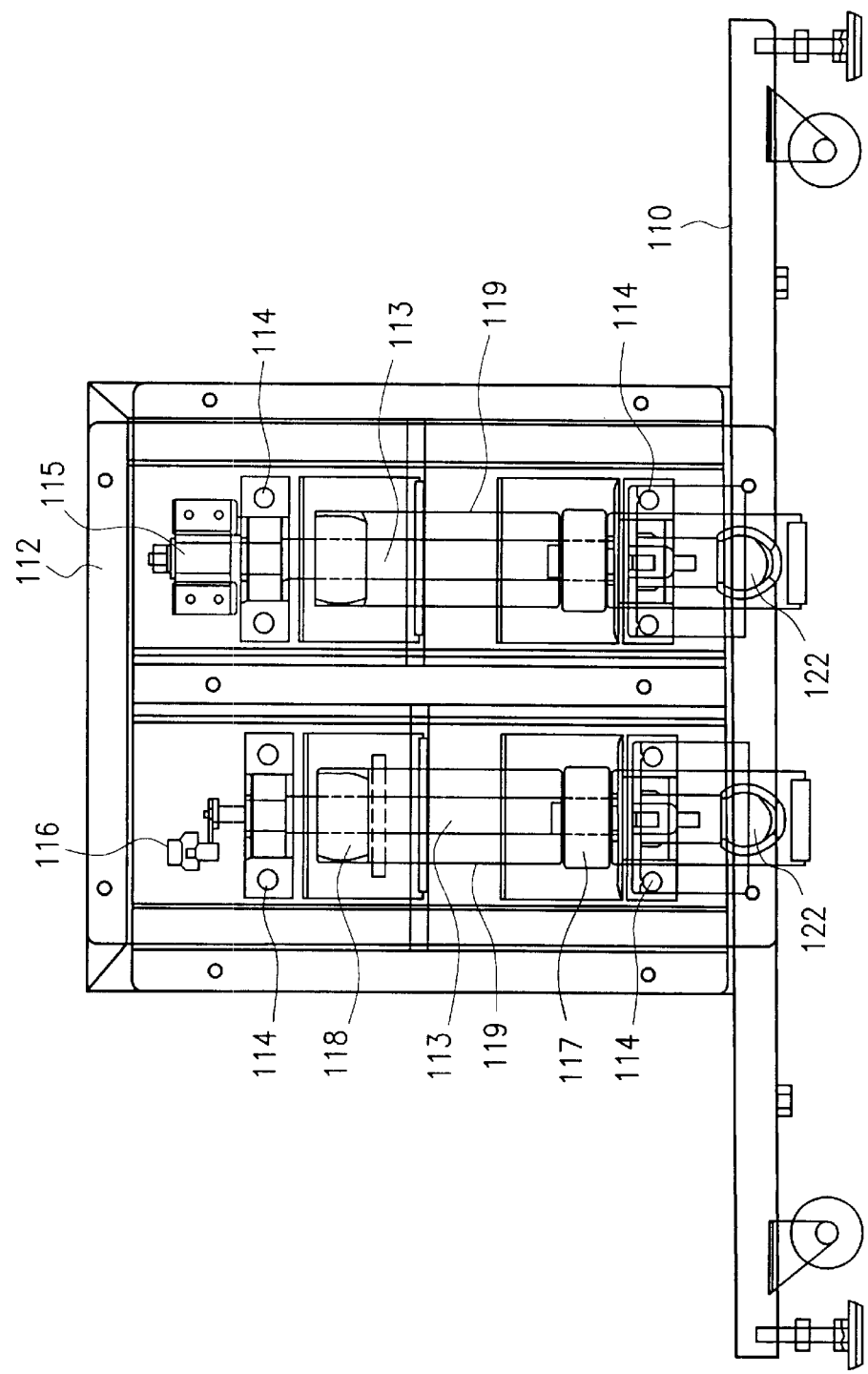
FIG. 10 is a front view of the mechanism of the ski simulator.
Figure 11:
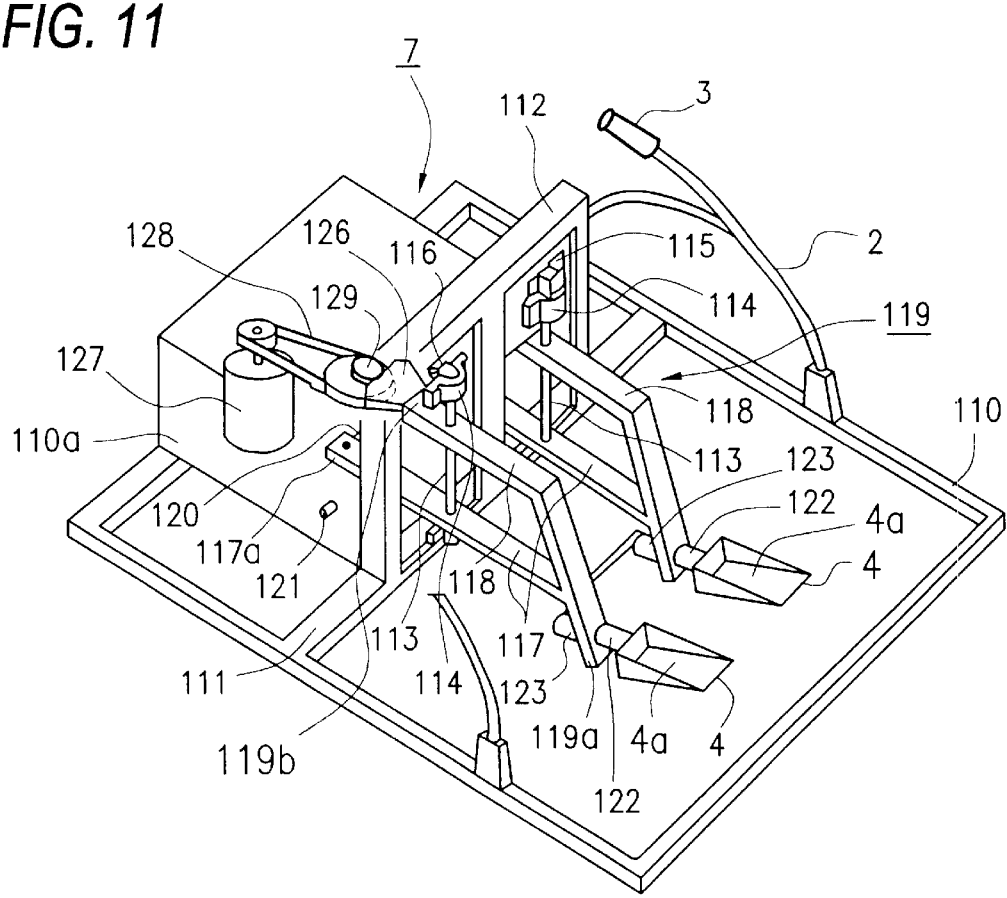
FIG. 11 is a perpendicular view of the mechanism of the ski simulator.

FIG. 9 is a side view of a ski mechanism, and FIG. 10 is a front view of the ski mechanism. FIG. 11 is a perspective view of the ski mechanism. The ski mechanism will be now explained in accompanying with those drawings.

A horizontal frame 111 is bridging over the squared frame 110 adapted to sit on the floor at the center position of the frame 110, and a vertical frame 112 is standing from the center of the horizontal frame 111. On the left and right sides of the horizontal frame 112, bearings 114 are secured at the top and bottom of the vertical frame 112 so as that a pair of vertical shafts 113 can be twisted. A roster 115 for centering the vertical shafts 113 is fastened at one of the upper ends of the bearings provided on the top side.

One of the vertical shafts 113 of which upper end is squared having the roaster 115 and a squared tube of which sides are contacted to the squared end is fastened to the vertical frame 112. Then, the squared tube is basically positioned to the squared end at an angle of 45°, an elastic body is filled between the squared tube and the squared shaft end, and therefore, when the vertical shaft 113 is twisted, the vertical shaft 113 is centered by the elastic force of the elastic body.

A rotary angle detecting sensor 116 for detecting volumes or the like is provided on the other end of the bearings 114 provided on the upper side to electrically detect an angle for rotating the vertical shaft 113.

Frames 117 extending parallel to the squared frame 110 are fastened to the bottom ends of the pair of the vertical shafts 113, and frames 118 extending parallel to a horizontal direction and bending downwardly is fastened to the upper end of the vertical shaft 113. The both frames 117 and 118 are united to form a swing frame 119 twisting in horizontal to the vertical shafts 113.

A pair of the swing frames 119 are respectively fastened to the left and right vertical shafts 113. Each back ends 117a of the frames 117 are connected by a link 120 in parallel to each other. Therefore, it is possible to rotate the pair of the swing frames 119 in horizontal by each vertical shaft 113 with keeping parallel of each frame 119 conjointly with fastening to the vertical shafts 113. Then, the frames 119 swings to the left and right direction until the outside sections of the left and right frames 117 are contacted to left and right bumpers 121 provided on the frame.

The steps 4 for putting the player's feet are ratably fastened to inclined shafts 122 of which one end is slightly slanted to the upper side through the roster 123. The step surfaces 4a of the steps 4 are inclined toward the bottom side. The other ends of the inclined shafts 122, which are not connected to the steps 4, have a rotary angle detecting sensors 124 for detecting the volumes or the like, shown in FIG. 9, to electrically detect the rotary angle of the inclined shafts 122. The inclined shafts 122 of the steps 4 are respectively linked by a link 125, and each steps 4 are synchronized and rotated by the inclined shafts 122.

According to the above-described mechanism, the swing frames 119 and the steps 4 are respectively centered by the rosters 115 and 123, automatically.

A drive in the body controller 8 will be now explained. A sector gear 126 is fastened to the upper-back end 119b of the left swing frame 119. A motor 127 provided on a base section 110a of the squared frame 110 propagates a rotary force to the sector gear 126 through a belt 128 and a gear 129 and rotates the sector gear 126 to swing the swing frames 119 around the vertical shafts 113.

Figure 12:
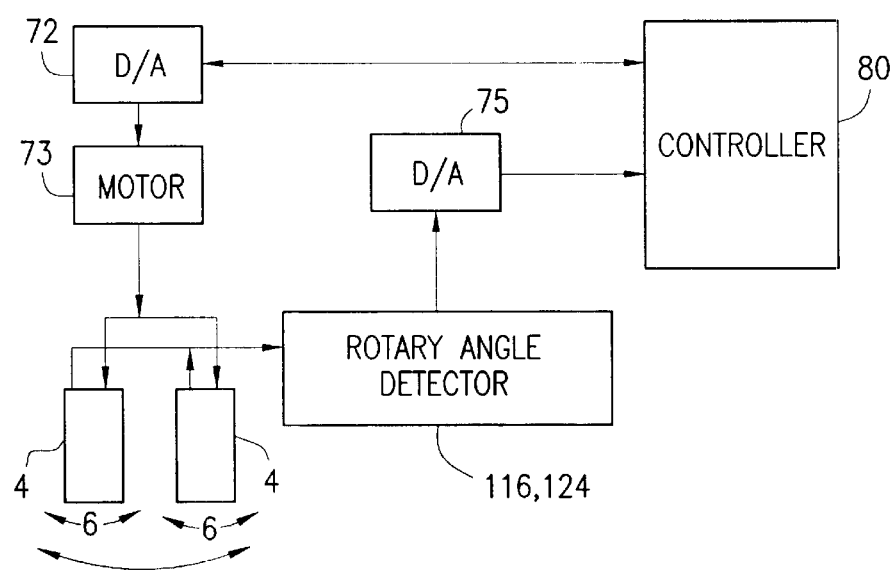
FIG. 12 is a block diagram of a ski driving section.

FIG. 12 is a block diagram of a ski controlling section. It is shown by making FIG. 3. Simple. The ski driving section 7 sends the motor driving signal sent from the controlling section 80 for controlling the ski game to the D/A converter 72 for converting from digital signals to analog signals and rotates the motor 127 (73) in a clockwise or counterclockwise direction according to the analog signals converted in the D/A converter 72. Thereby, the swing frames 119 can be swung side by side.

On the other hand, the swings of the swing frames 119 are detected by a rotary angle detecting sensor 116, and the rotations of the steps 4 are detected by a rotary angle detecting sensor 124. These detecting signals are converted to digital signals by the A/D converter 75 for converting from analog signals to digital signals. The converted signals are sent to the controller 80 for use in arithmetic operations on next stage of the ski game.

The controller 80 makes it possible to propagate vibrations and shocks to the player according to the condition of the course displayed on the large monitor 1 by strengthening and weakening the centering force of the swing frames 119 under the control of a torque of the motor 127.

Therefore, as the swing frames 119 can be rotated by the motor 127, vibrations or shocks can be given to the step 4 by controlling the motor 127, and therefore, the operator can feel as if he can feel the motions from the skis, thereby giving realistic skiing situation.

Figure 13:
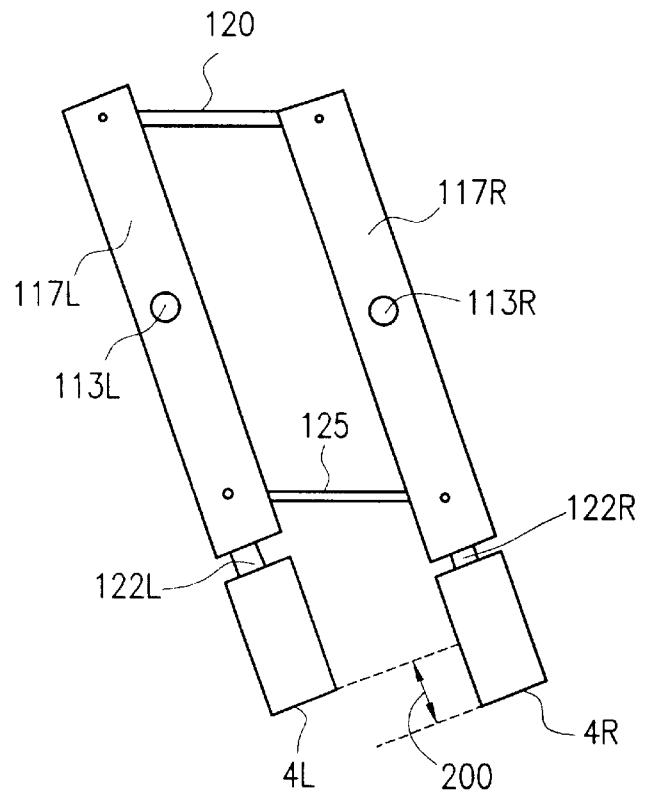
FIG. 13 is a top view when an operator rotates steps to the right as if he or she turns to the left.
Figure 14:
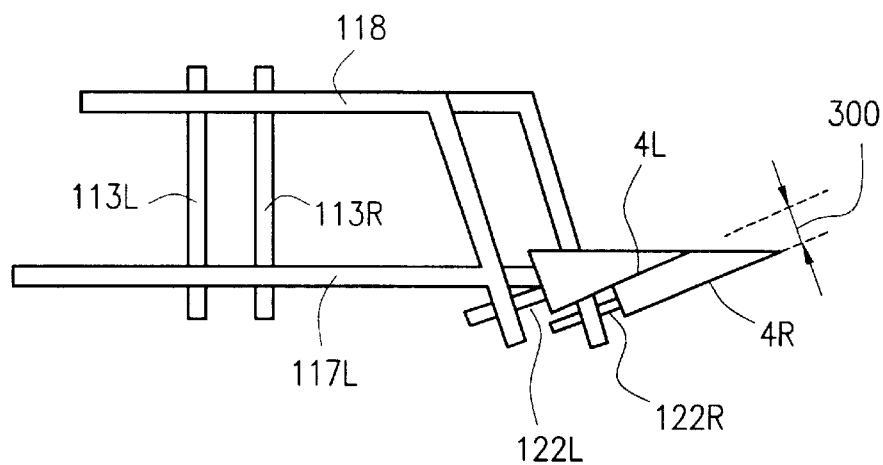
FIG. 14 is a side view as the diagram of FIG. 13 is viewed in perpendicular to a frame 117 from left back side.

FIG. 13 is a top view when the operator twists the steps 4 to the right as if he turns the skis to the left. FIG. 14 is a side view of FIG. 13 viewing from the backside at a right angle to the frames 117. Same reference numbers are denoted to those shown in FIG. 11, each of which respectively has L or R showing left or right. The swing frames 119 can swing in a range between an angle of 22° to the left side and an angle of 22° to the right side, i.e., within 44° in total. Additionally, the swing frames 119 rotate around each vertical shaft 113 as keeping a form of a parallelogram with link poles 120 and 125. Therefore, as shown in FIG. 13, the positions of the steps L4 and R4 have a front-back difference 200. In other word, as the steps 4 move unitedly with the swing frames 119, the front-back difference is generated between the left and right steps 4L and 4R by moving the swing frames 119 side by side.

Further, the steps 4 rotates with having an angle of 75° to the inclined shaft 122. Therefore, as shown in FIG. 14, an up-down difference 300 is generated between the positions of the steps 4L and 4R. Then, the inner foot is positioned forward and the outer foot is positioned backward as needed when rotating, and further, the inner foot is positioned upward and the outer foot is positioned downward. Therefore, the motions of left and right feet become similar to the real turning of skis.

The steps 4 are inclined so as that the operator can stand easily and he can bend his or her knees to put his or her power on his or her legs.

In the present embodiment, the steps 4 for putting the operator's left and right feet each of which has an inclined shaft 122 for rotating independently are separated according to the above described mechanism. The left and right steps 4 are linked by one link 125 to move in parallel so that the operator can operate easily and beginners can also operate in a right position.

Additionally, the surfaces 4a of the right and left steps 4 for putting the player's feet are inclined in a direction where the player can take up the stance for leaning forward, i.e., an actual skiing form, and therefore, the operator can easily take up the stance for traversing on a slope of the snow surface.

According to the above-described mechanism, the player can operate the ski game more close to reality than operations on the conventional game machine, and every players from beginners to high-grade skiers can operate the machine in a right and beautiful position. Therefore, the steps can be easily and smoothly changed by loading or unloading on left or right foot when the player turns by loading on his or her outer foot in real or turns the ski to the other side to the outside foot.

Therefore, the inclined shafts 122 for rotating the steps 4 for putting the operator's left and right feet are independently provided to the swing frames 119, the step surfaces 4a have an angle from a horizontal axis, and therefore, the up-down difference between the left and right feet can be created. Additionally, the normal lines of the step surfaces 4a always rotate toward the inside and the operator can easily bend his or her knees by taking up the stance for descending the inclined snow surface, and therefore, the operator can easily change the load of his or her foot.

As described above, according to the present invention, it can be realized that the player can operate the machine easily and keep beautiful and right stance regardless of the operator's technique for skiing. It is further possible to practice skiing enough without displaying the video image pictures on the large monitor 1 by using the mechanical section only. Additionally, the large monitor 1 is positioned forward having an angle of about 10 degrees, a ski course on an inclined snow surface is displayed on the monitor 1 such that the course having a slope exists forward, and the steps for putting the operator's feet are inclined. This gives the operators actual skiing course.

Applicability of the Industries

As explained above, according to the present invention, skier's loci are arithmetized by executing a game or simulating program according to a control signal through skis of a player in the ski game machine or the ski simulator, and spurs of the skis are stored and displayed as polygon data according to the arithmetized locus. Therefore, the spurs can be continued to display on the ski course until the course is finished or the game is over. It is possible to continue storing and displaying the spur over several games by making the memory capacity for storing the polygon data increase.

As the condition of the legs is obtained by arithmetic operations from the foot positions decided depending on the snow surface and the waist position dropped by delaying from the foot drops, it is also possible to display the foot motions according to unevenness or an inclined angle of the snow surface, thereby giving the player an experience close to reality.

Vibrations are given to the players through a motor when comparing a degree of left and right directions and a rotation degree for getting up edges of skis the player operates with predetermined thresholds and the degrees are larger than the thresholds. Therefore, the player can have an experience close to reality.

Alternatively, according to the present invention, when there is a need to guide the skier such that the position of the skier corresponding to the player in the game is on a predetermined position, the game executing section generates a new progress vector according to a guide program and generates a driving signal for guide according to the vector. Therefore, it is possible to teach the player by giving a drive for guide the player through skis. It is also possible to give the player virtual reality close to reality by changing video images on the display device according to the drive for guide.

It is further possible to give the player virtual reality close to reality as a drive force is compulsorily put on the skis 4 as varying the display screen, when the skier is out of the ski course or bumps to the obstacle, and therefore, a correspondence can be maintained between the player and the displayed screen.

Further, the above-described mechanism includes swing frames combining the left and light vertical shafts with the inclination of the steps. When the operator puts his or her feet on the steps and only rotates the skis, a front-back difference of the legs and the up-down difference of the steps can be created as if the player is skiing in real, and further, the step surfaces of the steps are always faced to the direction of a center of the rotation. Thereby, even if the player is a beginner of skiing, he can move his or her legs beautifully. Additionally, it is possible to change the player's feet as if he walks like an actual skiing motion.

Additionally, the operator easily centers his or her body and bends his or her knees to the inside as the step surfaces are inclined forward and are always faced to the inside. It is also possible to express outer factor such as sliding of skis according to reactions of a motor or bounding of the skis according to the edging operation.

What is claimed is:

1. A game machine, executing a game program in response to a control signal given by operating imitation means by a player and displaying an object corresponding to the player, comprising:

an imitation operation detector for detecting a direction and a degree of operation of the imitation operation means and generating the control signal;

a control unit for obtaining current position data of said object on a course from course data and the control signal, generating polygon data showing a track of said object according to said position data, and generating display data of the tracks for displaying on a display screen according to said generated polygon data of the tracks; and a display for displaying said tracks of the object with the course according to said display data of the tracks generated by said control unit.

2. A game machine, executing a game program in response to a control signal given by rotating imitation operation means by a player to display an object corresponding to the player on a display device, comprising:

a rotation detector for generating the control signal by detecting a rotation of the imitation operation means;

a storage medium for storing at least position data, predetermined width data, and inclination data on a plurality of passing points of a predetermined route on a course;

a control unit for obtaining position data showing a current position of the object on said course according to data of the course and the control signal, detecting said position is out of the predetermined width of the course, obtaining a progress vector of a direction where the object's position is close to the predetermined route, and generating a driving signal for driving the imitation operation means according to said progress vector; and an imitation operation means driver for rotatably driving the imitation operation means according to said driving signal of the imitation operation means generated by said control unit.

3. A game machine in which a game program is executed in response to a control signal given by rotating imitation operation means by a player to display an object corresponding to the player on a display device, comprising:

a rotation detector for generating the control signal by detecting a rotation of the imitation operation means;

a storage medium for storing at least position data, predetermined width data, and inclination data on a plurality of passing points of a predetermined ski course;

a control unit for obtaining position data showing the current position of the player on said course according to data of the course and the control signal, detecting that said position is corresponding or is close to that of an obstacle on said course, obtaining a progress vector of a direction where the player's position is close to the predetermined route, and generating a driving signal for driving the imitation operating means according to said progress vector; and a driver for rotatably driving the imitation operating means according to said driving signal generated by said control unit.

4. A game machine, executing a game program in response to a control signal given by rotating imitation operating means by a player to display an object corresponding to the player on a display device, comprising:

an imitation operating means rotation detector for generating the control signal by detecting a direction of the imitation operating mean;

a storage medium for storing at least position data on a plurality of passing points on a predetermined course, predetermined width data on said passing points of said course and inclination data on said course;

a control unit for obtaining position data showing the current position of the player on said course according to data of course and the control signal, detecting that said position is corresponding to or is close to that of an obstacle on said course, obtaining a new progress vector for reducing a difference of an angle between the progress vector of the player and an ideal progress vector towards a direction for tying the passing points, and generating a driving signal for driving the imitation operating means according to said progress vector; and a driver for rotatably driving the imitation operating means according to said driving signal generated by said control unit.

5. A machine in which a game program is executed in response to a control signal given by rotating imitation operating means by a player to display an object corresponding to the player on a display device, comprising:

an imitation operating means rotation detector for generating the control signal by detecting a rotation of the imitation operating means;

a storage medium for storing at least course data having data of a predetermined route on a course;

a control unit for obtaining position data showing the current position of the player on said course according to said control signal and generating the driving signal of the imitation operating means to move said position to the predetermined route; and a driver for rotatably driving the imitation operating means according to said driving signal on the imitation operating means generated by said control unit.

6. A game machine in which a game program is executed in response to a control signal given by operating imitation operation means by a player to display an object corresponding to the player, comprising:

a storage medium for storing at least course data having data of a predetermined route on a course;

a control unit for obtaining position data showing a current position of the object on a course according to the control signal and generating a driving signal of the imitation operation means to move said position to the predetermined route; and a driver for driving the imitation operation means according to said driving signal generated by said control signal.

* * * * *